(12) United States Patent
Kawamoto et al.

(10) Patent No.: US 10,527,161 B2
(45) Date of Patent: Jan. 7, 2020

(54) CONTROL DEVICE FOR AUTOMATIC TRANSMISSION AND CONTROL METHOD FOR AUTOMATIC TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Yoshinobu Kawamoto, Seoul (KR); Seiji Kasahara, Atsugi (JP); Haibin Ma, Guangdong (CN)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 23 days.

(21) Appl. No.: 15/757,841

(22) PCT Filed: Sep. 7, 2016

(86) PCT No.: PCT/JP2016/076337
§ 371 (c)(1),
(2) Date: Mar. 6, 2018

(87) PCT Pub. No.: WO2017/043543
PCT Pub. Date: Mar. 16, 2017

(65) Prior Publication Data
US 2018/0355969 A1 Dec. 13, 2018

(30) Foreign Application Priority Data
Sep. 10, 2015 (JP) .................................. 2015-178441

(51) Int. Cl.
*F16H 61/02* (2006.01)
*F16H 3/66* (2006.01)
(Continued)

(52) U.S. Cl.
CPC ......... *F16H 61/0204* (2013.01); *F16H 3/663* (2013.01); *F16H 61/20* (2013.01);
(Continued)

(58) Field of Classification Search
None
See application file for complete search history.

(56) References Cited

U.S. PATENT DOCUMENTS 8,762,011 B2 * 6/2014 Ishida ............... F16H 61/66259
477/48
2001/0002452 A1 * 5/2001 Bacher .................. B60W 10/02
701/67

(Continued)

FOREIGN PATENT DOCUMENTS

JP     2001-263481 A    9/2001
JP     2001-280485 A    10/2001
(Continued)

*Primary Examiner* — Justin Holmes
(74) *Attorney, Agent, or Firm* — Foley & Lardner LLP

(57) ABSTRACT

A control device that controls an automatic transmission is provided, in which device the automatic transmission includes a variator disposed in a power transmission path between a driving source and a driving wheel of a vehicle, and a friction engaging element disposed between the variator and the driving wheel, in a manner capable of transmitting a power disconnectably via the power transmission path. The control device increases a speed ratio of the variator toward a predetermined target speed ratio with disengaging the friction engaging element during a vehicle stop of the vehicle, and executes a learning regarding a hydraulic control of the friction engaging element when the friction engaging element is disengaged during the vehicle stop. The control device decreases the target speed ratio at a time of learning when the learning is executed during the vehicle stop, compared to a time of vehicle stop other than the time of learning.

12 Claims, 4 Drawing Sheets

(51) Int. Cl.
*F16H 61/20* (2006.01)
*F16H 61/662* (2006.01)

(52) U.S. Cl.
CPC .............. *F16H 61/66272* (2013.01); *F16D 2500/1026* (2013.01); *F16D 2500/1088* (2013.01); *F16D 2500/3144* (2013.01); *F16D 2500/31426* (2013.01)

(56) References Cited

U.S. PATENT DOCUMENTS

| | | | |
|---|---|---|---|
| 2004/0111204 A1 | 6/2004 | Kojima et al. | |
| 2012/0322613 A1* | 12/2012 | Suzuki | F16H 61/16 477/41 |
| 2016/0214610 A1 | 7/2016 | Kotsuji et al. | |
| 2018/0281799 A1* | 10/2018 | Kawamoto | B60W 10/026 |

FOREIGN PATENT DOCUMENTS

| | | |
|---|---|---|
| JP | 2004-190756 A | 7/2004 |
| JP | 2011-247370 A | 12/2011 |
| JP | 2015-055337 A | 3/2015 |

* cited by examiner

CONTROL DEVICE FOR AUTOMATIC TRANSMISSION AND CONTROL METHOD FOR AUTOMATIC TRANSMISSION

TECHNICAL FIELD

The present invention relates to a control device and a control method for an automatic transmission that execute a learning regarding a hydraulic control of a friction engaging element during a vehicle stop.

BACKGROUND ART

JP2001-280485 discloses a control that causes a friction element to slip to bring the friction element into close to a neutral state when a vehicle stops while a shift lever is in a traveling range. When executing such a control, JP2001-280485 learns and corrects an engaging force command value of the friction element.

During a vehicle stop, in a variator, a speed ratio of the variator is maintained at a speed ratio on a Lowest side (hereinafter, referred to as a "Lowest speed ratio") for a next vehicle start. Then, when the speed ratio is not the Lowest speed ratio during the vehicle stop, the speed ratio is shifted to the Lowest speed ratio from the speed ratio during the vehicle stop. In this case, a target speed ratio is set to a largest value (hereinafter, referred to as a "mechanical largest speed ratio") of the speed ratio, which is on a further Low side with respect to the Lowest speed ratio and can be mechanically taken by the variator, such that an actual speed ratio becomes the Lowest speed ratio even when a variation and the like are present. Setting the target speed ratio to this mechanical largest speed ratio enables to cause the actual speed ratio to be close to the Lowest speed ratio regardless of the variation to ensure reducing a driving force shortage at the time of the vehicle start.

However, there is a case where a hydraulic pressure supplied to the variator becomes low during the vehicle stop and the actual speed ratio of the variator cannot be brought into the Lowest speed ratio. This, for example, can happen when an engine rotational speed is lowered with the vehicle stop to cause a decreased amount of oil discharged from an oil pump driven by being transmitted the rotation of the engine. In such a case, in order to cause the actual speed ratio to be close to the target speed ratio (the mechanical largest speed ratio when the target speed ratio is the mechanical largest speed ratio), a lowering command of a primary pulley pressure or an increasing command of a secondary pulley pressure are continued to be output by a feedback control. When such commands are output, a friction in the variator varies.

Thus, when the friction of the variator varies, an input rotational speed of the variator, in other words, a turbine rotational speed of a torque converter varies. Then, when the friction in the variator increases in a state where the friction engaging element is disengaged in a vehicle where the friction engaging element, such as a clutch, is disposed between the variator and a driving wheel, a load in the variator increases; therefore, the turbine rotational speed is lowered. On the other hand, when the friction in the variator decreases in a similar state, the load in the variator lowers; therefore, the turbine rotational speed is increased.

Learning and correcting the above-described engaging force command value is typically performed on the basis of the turbine rotational speed; therefore, when the friction of the variator varies and the turbine rotational speed varies during the learning, the learning and correcting cannot be stably executed, thus deteriorating a learning accuracy.

Then, in one aspect of the present invention, a control device that controls an automatic transmission is provided, in which device the automatic transmission includes a variator disposed in a power transmission path between a driving source and a driving wheel of a vehicle, and a friction engaging element disposed between the variator and the driving wheel, in a manner capable of transmitting a power disconnectably via the power transmission path. In this aspect, a speed ratio of the variator is increased toward a predetermined target speed ratio with disengaging the friction engaging element during a vehicle stop of the vehicle, and a learning regarding a hydraulic control of the friction engaging element is executed when the friction engaging element is disengaged during the vehicle stop. Furthermore, the target speed ratio is decreased at a time of learning when the learning is executed during the vehicle stop, compared to a time of vehicle stop other than the time of learning.

Furthermore, in another aspect of the present invention, a control method of controlling an automatic transmission is provided, in which method a variator is disposed in a power transmission path between a driving source and a driving wheel of a vehicle, and a friction engaging element is disposed between the variator and the driving wheel, in a manner capable of transmitting a power disconnectably via the power transmission path. In this aspect, a speed ratio of the variator is increased toward a predetermined target speed ratio with disengaging the friction engaging element during a vehicle stop of the vehicle, and a learning regarding a hydraulic control of the friction engaging element is executed when the friction engaging element is disengaged during the vehicle stop. Furthermore, the target speed ratio is decreased at a time of learning when the learning is executed during the vehicle stop, compared to a time of vehicle stop other than the time of learning.

With the above-described aspect, the learning regarding the hydraulic control of the friction engaging element can be accurately executed during the vehicle stop.

DESCRIPTION OF EMBODIMENTS

The following describes an embodiment of the present invention with reference to attached drawings.

In the following description, a "speed ratio" is a value obtained by dividing an input rotational speed $N1$ of a transmission mechanism by an output rotational speed $N2$ of the transmission mechanism ($=N1/N2$). When the speed ratio is large, it is referred to as the speed ratio is on a "Low side" and when the speed ratio is small, it is referred to as the speed ratio is on a "High side." When the speed ratio is shifted to the Low side with respect to the present is referred to as a downshift and shifted to the High side is referred to as an upshift.

Figure 1:
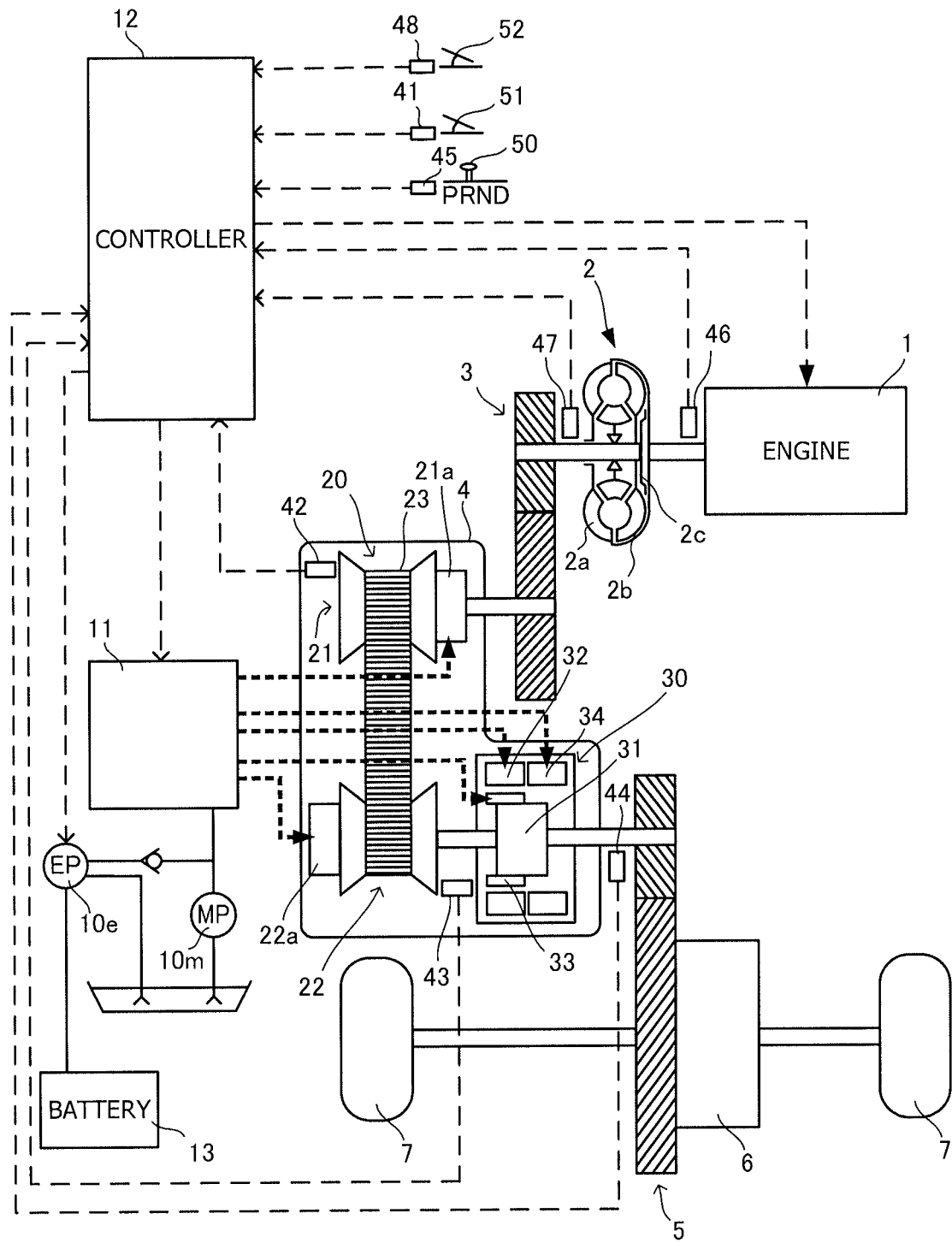
FIG. 1 is a schematic configuration diagram of a vehicle according to one embodiment of the present invention.

FIG. 1 is a schematic configuration diagram of a vehicle according to one embodiment of the present invention. This vehicle includes an internal combustion engine (hereinafter simply referred to as an "engine") 1 as a driving source. A rotative power of the engine 1 is input to a pump impeller 2a of a torque converter 2 including a lock-up clutch 2c via its output shaft to be transmitted to a driving wheel 7 via from a turbine runner 2b to a first gear train 3, a transmission mechanism 4, a second gear train 5, and a differential gear 6. The torque converter 2, the first gear train 3, the transmission mechanism 4, and the second gear train 5 constitute an "automatic transmission" according to the embodiment.

The rotative power of the engine 1, that is, a torque is input to the transmission mechanism 4. The transmission mechanism 4 includes a mechanical oil pump 10m driven by using a part of a power of the engine 1 and an electric oil pump 10e driven by receiving an electric power from a battery 13. The transmission mechanism 4 includes a hydraulic control circuit 11 that adjusts a pressure of an oil discharged from the mechanical oil pump 10m or the electric oil pump 10e to generate a necessary hydraulic oil pressure and supplies each site of the transmission mechanism 4. It should be noted that the electric oil pump 10e is an oil pump smaller than the mechanical oil pump 10m.

The transmission mechanism 4 includes a belt continuously variable transmission mechanism (hereinafter referred to as a "variator") 20 and a sub-transmission mechanism 30 disposed in series with the variator 20. Here, "disposed in series" means that the variator 20 and the sub-transmission mechanism 30 are disposed on an identical power transmission path from the engine 1 to the driving wheel 7. The sub-transmission mechanism 30 may be directly coupled to an output shaft of the variator 20 as this embodiment or may be coupled via another transmission or power transmission mechanism (such as, a gear train).

The variator 20 includes a primary pulley 21, a secondary pulley 22, a V belt 23 stretched around each of the pulleys 21 and 22. The variator 20 has a width of a V groove changed corresponding to a hydraulic pressure supplied to a primary pulley oil chamber 21a (hereinafter, referred to as a "primary pulley pressure") Ppri and a hydraulic pressure supplied to a secondary pulley oil chamber 22a (hereinafter, referred to as a "secondary pulley pressure") Psec to change a contact radius between the V belt 23 and each of the pulleys 21 and 22, thus steplessly changing a speed ratio Ia of the variator 20.

The sub-transmission mechanism 30 is a transmission mechanism having two stages for forward and one stage for backward. The sub-transmission mechanism 30 includes a Ravigneaux type planetary gear mechanism 31 and a plurality of friction engaging elements (a Low brake 32, a High clutch 33, and a Rev brake 34). The Ravigneaux type planetary gear mechanism 31 couples carriers of two planetary gears. The friction engaging elements are coupled to a plurality of rotating elements constituting the Ravigneaux type planetary gear mechanism 31 to change a linking state of these. Adjusting the hydraulic pressure supplied to the respective friction engaging elements 32 to 34 to change engaging or disengaging states of the respective friction engaging elements 32 to 34 ensures changing a speed ratio Is of the sub-transmission mechanism 30.

Specifically, when the Low brake 32 is engaged and the High clutch and the Rev brake 34 are disengaged, a gear position of the sub-transmission mechanism 30 is a first speed stage. When the High clutch 33 is engaged and the Low brake 32 and the Rev brake 34 are disengaged, the gear position of the sub-transmission mechanism 30 is a second speed stage where a speed ratio is smaller than the first speed stage. When the Rev brake 34 is engaged and the Low brake 32 and the High clutch 33 are disengaged, the gear position of the sub-transmission mechanism 30 is a reverse gear.

Changing the speed ratio Ia of the variator 20 and the speed ratio Is of the sub-transmission mechanism 30 changes a speed ratio I of the whole transmission mechanism 4.

Figure 2:
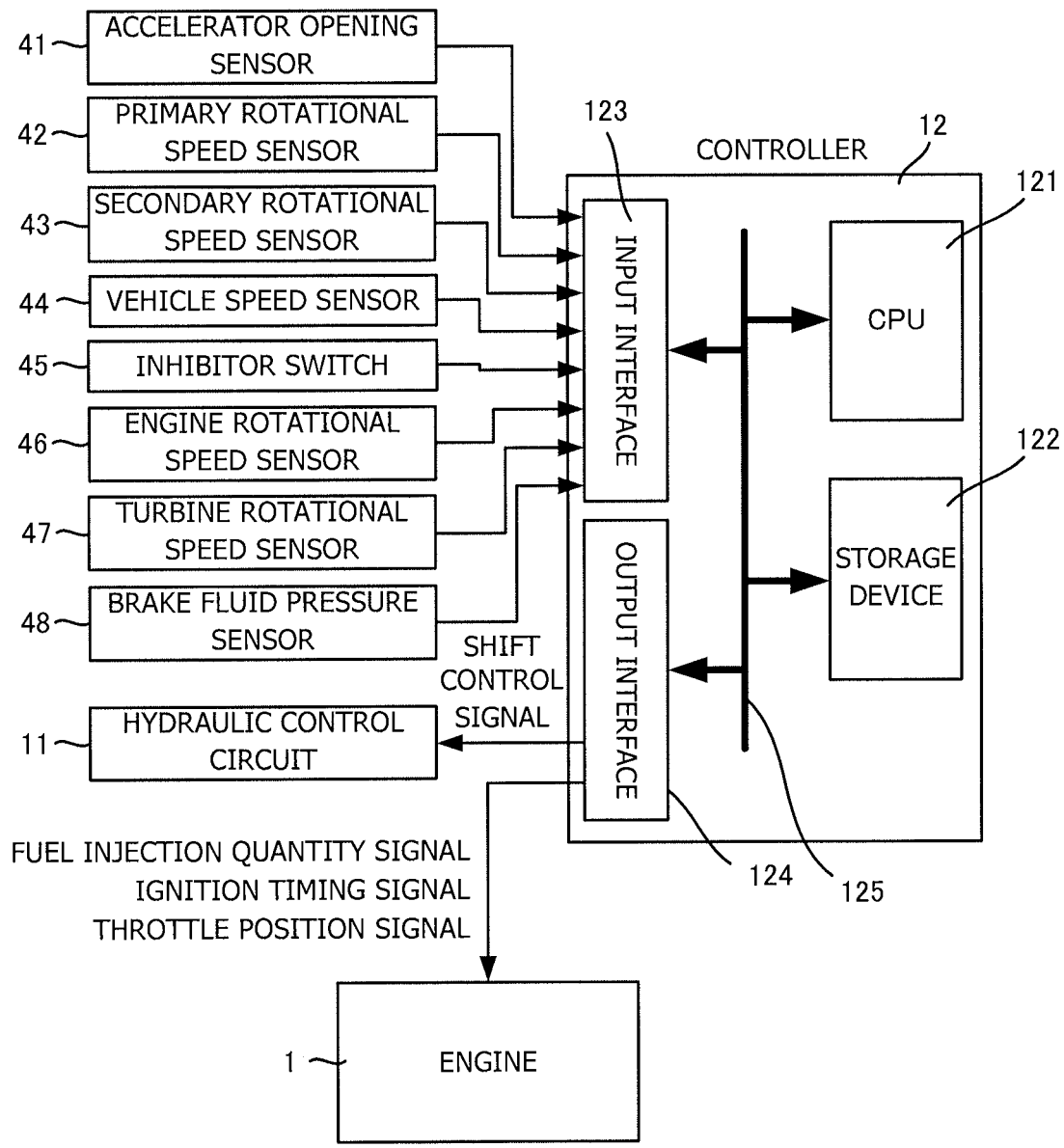
FIG. 2 is a schematic configuration diagram of a controller according to ditto embodiment.

A controller 12 is the controller 12 that integrally controls an operation of the engine 1 and the transmission mechanism 4. As illustrated in FIG. 2, the controller 12 is constituted of a CPU 121, a storage device 122 constituted of a RAM and a ROM, an input interface 123, an output interface 124, and a bus 125 that mutually couples these. The controller 12 constitutes a "control device" according to the embodiment.

As signals to indicate actual operating states of the engine 1 and the automatic transmission, an output signal of an accelerator pedal opening sensor 41 that detects an accelerator pedal opening APO as an operating amount of an accelerator pedal 51 by a driver, an output signal of a primary rotational speed sensor 42 that detects a primary pulley rotational speed Npri as a rotational speed of the primary pulley 21, an output signal of a secondary rotational speed sensor 43 that detects a secondary pulley rotational speed Nsec as a rotational speed of the secondary pulley 22, an output signal of a vehicle speed sensor 44 that detects a vehicle speed VSP, an output signal of an inhibitor switch 45 that detects a position of a shift lever 50, an output signal of an engine rotational speed sensor 46 that detects an engine rotational speed Ne as a rotational speed of an output shaft of the engine 1, an output signal of a turbine rotational speed sensor 47 that detects a turbine rotational speed Nt as a rotational speed of an output shaft of the torque converter 2, an output signal from a brake fluid pressure sensor 48 that detects a brake fluid pressure BRP corresponding to an operating amount of a brake pedal 52, and similar signal are input to the input interface 123.

The storage device 122 stores a control program for the engine 1, a shift control program for the transmission mechanism 4, and various maps and tables used for these programs. The CPU 121 reads and runs the programs stored in the storage device 122, performs various operation processes on various signals input through the input interface 123, creates a fuel injection quantity signal, an ignition timing signal, a throttle position signal, and a shift control signal, and outputs the created signals to the engine 1 and the hydraulic control circuit 11 through the output interface 124. The storage device 122 appropriately stores various values used for the operation processes by the CPU 121 and the results of the operations.

The hydraulic control circuit 11 is constituted of a plurality of flow passages and a plurality of hydraulic control valves. The hydraulic control circuit 11 controls the plurality of hydraulic control valves to switch a supply passage for the hydraulic pressure on the basis of a shift control signal from the controller 12. Additionally, the hydraulic control circuit 11 prepares a necessary hydraulic pressure from the pressure of the oil discharged from the mechanical oil pump 10m or the electric oil pump 10e and supplies this hydraulic pressure to each site of the transmission mechanism 4. This changes the speed ratio Ia of the variator 20 and the speed ratio Is of the sub-transmission mechanism 30, shifting the transmission mechanism 4.

In this embodiment, a learning regarding a hydraulic control of the friction engaging elements 32 to 34 is executed during the vehicle stop. Specifically, a hydraulic pressure at which the Low brake 32 starts to transmit a torque when the Low brake 32 of the sub-transmission mechanism 30 is engaged from a disengaged state is learned while the Low brake 32 is disengaged. Here, this hydraulic pressure learning will be described in details.

Figure 3:
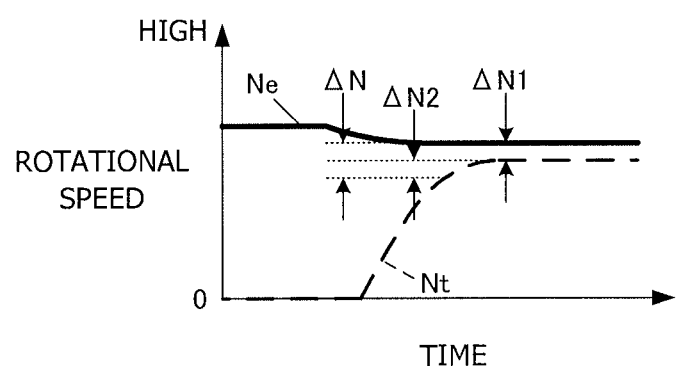
FIG. 3 is an explanatory view illustrating changes of an engine rotational speed and a turbine rotational speed when a forward clutch is disengaged in ditto embodiment.

The hydraulic pressure learning is executed during a neutral idle control (hereinafter, referred to as an "N idle control") that disengages the Low brake 32 for the purpose of an improved fuel efficiency by a decreased load to the engine 1 when the vehicle is stopped in a state where the shift lever 50 is in a traveling range, for example, a D (drive) range. When the N idle control is executed and the hydraulic pressure of the Low brake 32 is lowered, as illustrated in FIG. 3, an engine rotational speed Ne and a turbine rotational speed Nt change with an elapse of time. In FIG. 3, the engine rotational speed Ne is indicated by a solid line and the turbine rotational speed Nt is indicated by a dashed line. It should be noted that during the vehicle stop, the lock-up clutch 2c is disengaged, and the torque converter 2 is in a converter state. The N idle control is executed by disengaging the High clutch 33 in the case where the High clutch 33 is engaged when the vehicle stops. The following describes the N idle control when the Low brake 32 is disengaged.

When the Low brake 32 is engaged at the time of the vehicle stop, since the turbine runner 2b does not rotate by a braking force applied to the vehicle, the turbine rotational speed Nt is zero (=0).

As soon as the N idle control is started to lower the hydraulic pressure command value of the Low brake 32 and lower the torque capacity of the Low brake 32, an input shaft of the Low brake 32 and rotational elements on the engine 1 side with respect to this input shaft become rotatable by the torque transmitted from the engine 1. Therefore, the turbine runner 2b starts to rotate and the turbine rotational speed Nt gradually increases.

As soon as the Low brake 32 is disengaged, the engine rotational speed Ne and the turbine rotational speed Nt converge to respective different rotational speeds. Accordingly, between the engine rotational speed Ne and the turbine rotational speed Nt, a deviation $\Delta N1$ is generated after the convergence.

The controller 12 learns the hydraulic pressure command value of the Low brake 32 at a time point when the deviation $\Delta N$ between the engine rotational speed Ne and the turbine rotational speed Nt becomes a deviation that a predetermined rotational speed difference $\Delta N2$ is added to the deviation $\Delta N1 (=\Delta N1+\Delta N2)$ after the above-described convergence in a process of disengaging the Low brake 32 as the hydraulic pressure at which the torque transmission of the Low brake 32 starts (hereinafter, the learned hydraulic pressure is referred to as a "learned hydraulic pressure" Ple). After the disengagement, in the case where the Low brake 32 is reengaged, setting the learned hydraulic pressure Ple to an initial hydraulic pressure at the time of the reengagement quickly finishes a piston stroke of the Low brake 32 to ensure a quick engagement of the Low brake 32. In this embodiment, the deviation $\Delta N1$, which will be described later in details, is stored in the controller 12. At the time of an actual learning, the deviation $\Delta N1$ stored in the controller 12 is used. The predetermined rotational speed difference $\Delta N2$ is preliminarily set by an experiment and the like. In this embodiment, since the output shaft of the torque converter 2 and the input shaft of the variator 20 are mechanically coupled via the first gear train 3, the turbine rotational speed Nt is an index of a rotation behavior or a rotational speed of the variator 20.

Decreasing the predetermined rotational speed difference $\Delta N2$ does not apply a sufficient hydraulic pressure to the Low brake 32 even though the learned hydraulic pressure Ple is supplied to the Low brake 32 as the initial hydraulic pressure when the Low brake 32 is engaged; therefore, the piston stroke of the Low brake 32 does not finish and the torque capacity is not generated in the Low brake 32. The Low brake 32 is possibly engaged suddenly to cause an engagement shock when the hydraulic pressure supplied to the Low brake 32 increases thereafter.

On the other hand, increasing the predetermined rotational speed difference $\Delta N2$ applies an excessively large hydraulic pressure to the Low brake 32 when the learned hydraulic pressure Ple is supplied to the Low brake 32 when the Low brake 32 is engaged; therefore, the torque capacity is possibly generated suddenly in the Low brake 32 to cause the engagement shock. A heat generation amount in the Low brake 32 increases to possibly lower a durability of the Low brake 32.

The predetermined rotational speed difference $\Delta N2$ is set taking such points into consideration.

However, even though the predetermined rotational speed difference $\Delta N2$ is set in view of the above-described aspects, it is concerned that the engagement shock is caused when the Low brake 32 is engaged and the durability is lowered as long as the learning accuracy is insufficient.

This is caused by a variation of a friction and a variation of the deviation $\Delta N1$ in the variator 20.

In this embodiment, the deviation $\Delta N1$ is a rotational speed difference between the engine rotational speed Ne and the turbine rotational speed Nt when the shift lever 50 is in the N range or the P range. When the shift lever 50 is in the N range or the P range, the hydraulic pressure is discharged from the Low brake 32 through a manual valve to disengage the Low brake 32. In the N range or the P range, the lock-up clutch 2c is disengaged. Therefore, when the shift lever 50 is in the N range or the P range and a predetermined time Tp elapses after the hydraulic pressure of the Low brake 32 is lowered, the rotational speed difference Nd between the engine rotational speed Ne and the turbine rotational speed Nt converges to a certain rotational speed difference. The converged rotational speed difference Nd is stored in the controller 12 as the deviation $\Delta N1$. It should be noted that when the deviation $\Delta N1$ is obtained by an operation, states of the variator 20 and the torque converter 2 are set to states identical to that at the time of the above-described learning and the operation value of the deviation $\Delta N1$ is stored so as to be used in the learning.

However, sometimes the turbine rotational speed Nt is not appropriately converged when the predetermined time Tp is elapsed.

When the variator 20 is controlled on the basis of a preliminarily set shift map and the shift lever 50 is in the N range or the P range, the variator 20 is controlled such that the speed ratio Ia of the variator 20 becomes the Lowest. Specifically, a target speed ratio It of the variator 20 is set to a speed ratio on the Low side with respect to the Lowest speed ratio and in a state where a movable pulley of the primary pulley 21 abuts on a stopper, that is, the mechanical largest speed ratio, which is a mechanically settable largest speed ratio. Then, an actual speed ratio Ia of the variator 20 is controlled to match this target speed ratio It. However, in a unit whose amount of oil discharged from the mechanical oil pump 10m is small or a unit whose amount of oil is decreased due to, for example, a deterioration, the actual speed ratio Ia does not become the mechanical largest speed ratio even when the target speed ratio It is set to the mechanical largest speed ratio. During the vehicle stop in particular, the engine rotational speed Ne is low and the amount of oil discharged by the mechanical oil pump 10m is small; therefore, the hydraulic pressure supplied to the variator 20 is low to make the actual speed ratio Ia difficult to reach the mechanical largest speed ratio.

In such a case, in order to make the actual speed ratio Ia reach the mechanical largest speed ratio, a command of downshift is continued to be output by the feedback control. This continues the lowering command of the primary pulley pressure Ppri or the increasing command of the secondary pulley pressure Psec to cause the primary pulley pressure Ppri and the secondary pulley pressure Psec to vary even after the predetermined time Tp is elapsed after the start of lowering the hydraulic pressure of the Low brake 32. Thus, the friction in the variator 20 varies, thereby varying the deviation ΔN1.

When the Low brake 32 is disengaged and the secondary pulley pressure Psec is increased, the friction in the variator 20 becomes large to increase the load of the variator 20. Therefore, the turbine rotational speed Nt is lowered to increase the deviation ΔN1. On the other hand, when the secondary pulley pressure Psec is lowered, the friction in the variator 20 becomes small to decrease the load of the variator 20. Therefore, the turbine rotational speed Nt is increased and the deviation ΔN1 becomes small.

In this embodiment in particular, the secondary pulley pressure Psec generates a sandwiching force so as not to cause a belt slip in the variator 20; therefore, the variation of the secondary pulley pressure Psec has a large influence on the friction in the variator 20 and a large influence on the variation of the deviation ΔN1.

Thus obtaining the deviation ΔN1 in a state where the friction varies and storing the deviation ΔN1 in the controller 12 generates the variation in the obtained deviation ΔN1 and the learning accuracy of the learned hydraulic pressure Ple deteriorates.

Therefore, in this embodiment, in order to improve the learning accuracy of the learned hydraulic pressure Ple, the following learning control is executed. The learning control according to the embodiment will be described with reference to a flowchart in FIG. 4.

At Step S100, the controller 12 executes a shift control of the variator 20. The shift control is a control that shifts the variator 20 on the basis of the preliminarily set shift map. In the shift control, when the vehicle is stopped and when the shift lever 50 is in the N range or the P range, the speed ratio Ia of the variator 20 is controlled toward the mechanical largest speed ratio.

At Step S101, the controller 12 determines whether the shift lever 50 is in the D range. When the shift lever 50 is not in the D range, the process proceeds to Step S102. When the shift lever 50 is in the D range, the process proceeds to Step S107.

At Step S102, the controller 12 determines whether the shift lever 50 is in the N range or the P range. When the shift lever 50 is in the N range or the P range, the process proceeds to Step S103. When the shift lever 50 is not in the N range or the P range, the current process is terminated. When the shift lever 50 is in the N range or the P range, the hydraulic pressure is discharged from the Low brake 32 through the manual valve (not illustrated). This disengages the Low brake 32.

At Step S103, the controller 12 sets the target speed ratio It of the variator 20 to a predetermined speed ratio Ip on the High side with respect to the mechanical largest speed ratio. The speed ratio Ip is a minimum value that the actual speed ratio Ia can take (the value on the Highest side) when a thrust ratio of the primary pulley 21 to the secondary pulley 22 is a thrust ratio to achieve the mechanical largest speed ratio. The actual speed ratio Ia is not constant and varies corresponding to a variation of a unit, an oil temperature, a deterioration of an oil, and the like even when the thrust ratio is made constant. Therefore, the speed ratio Ia that the variator 20 can actually take in the thrust ratio set to achieve the mechanical largest speed ratio is preliminarily obtained by, for example, an experiment, and the minimum value among them is set as the predetermined speed ratio Ip.

Setting the target speed ratio It to the High side with respect to the mechanical largest speed ratio decreases the feedback amount based on a deviation of the actual speed ratio Ia even when the actual speed ratio Ia varies with respect to the target speed ratio It; therefore, the lowering command of the primary pulley pressure Ppri and the increasing command of the secondary pulley pressure Psec by the feedback control decrease. Therefore, the variations of the primary pulley pressure Ppri and the secondary pulley pressure Psec can be reduced. Accordingly, the variation of the friction of the variator 20 is reduced, thereby ensuring reducing the variation of the deviation ΔN1.

Setting the target speed ratio It to the predetermined speed ratio Ip, in other words, setting the target speed ratio It to the minimum value of the actual speed ratio assumed with respect to the mechanical largest speed ratio causes the actual speed ratio Ia to be the speed ratio on the Low side with respect to the predetermined speed ratio Ip even when the actual speed ratio Ia is displaced off of the predetermined speed ratio Ip (the target speed ratio It). Accordingly, shifting in order to achieve the predetermined speed ratio Ip in the variator 20 is upshifting. In upshifting, it is only necessary to increase the primary pulley pressure Ppri and varying the secondary pulley pressure Psec is not necessary. Therefore, the variation of the secondary pulley pressure Psec can be reduced, thereby ensuring reducing the variations of the friction of the variator 20 and the deviation ΔN1.

At Step S104, the controller 12 sets a lower limit pressure Psec_lim of the secondary pulley pressure Psec to a predetermined lower limit pressure Ppsec. The predetermined lower limit pressure Ppsec is the higher value of the first predetermined pressure P1 and the second predetermined pressure P2.

The first predetermined pressure P1 is a pressure that generates a torque capacity larger than a lower limit value of the torque capacity that does not cause the belt slip with respect to an input torque Tin transmitted from the engine 1 and input to the variator 20. Here, since the engine 1 is in the idle state, the input torque Tin is a torque output from the engine 1 in the idle state. That is, the first predetermined pressure P1 is a pressure that generates the sandwiching force that does not cause the belt slip with respect to the engine torque in the idle state input to the variator 20.

The input torque Tin is operated from a turbine torque Tt. The turbine torque Tt can be calculated from an equation (1). In this embodiment, since the first gear train 3 is interposed between the torque converter 2 and the variator 20, the input torque Tin is calculated as a value that the turbine torque Tt is multiplied by the speed ratio of the first gear train 3.

$$Tt = \tau \times Ne^2 \times t \tag{1}$$

The $\tau$ is a torque capacity coefficient and the t is a torque ratio.

The engine rotational speed Ne detected by the engine rotational speed sensor 46 has a small variation width; therefore, a variation width of the turbine torque Tt is also small. Therefore, a belt capacity that does not cause the belt slip with respect to the input torque Tin and a variation width of the secondary pulley pressure Psec that generates the belt capacity are small. This ensures lowering the first predetermined pressure P1.

The second predetermined pressure P2 is the secondary pulley pressure Psec necessary for achieving the target speed ratio It when the primary pulley pressure Ppri becomes the lower limit pressure Ppri_lim that prevents the belt slip. When the variator 20 downshifts, the primary pulley pressure Ppri can be the lower limit pressure Ppri_lim that prevents the belt slip.

The downshift of the variator 20 is performed by executing one or both of lowering the primary pulley pressure Ppri and increasing the secondary pulley pressure Psec to generate a differential pressure between the primary pulley pressure Ppri and the secondary pulley pressure Psec. In order to increase the secondary pulley pressure Psec, it is necessary to increase the amount of oil discharged from the mechanical oil pump 10m or the electric oil pump 10e; therefore, a fuel consumption quantity or a power consumption quantity increases. Therefore, from the aspect of the fuel consumption quantity and the power consumption quantity, the downshift is preferred to be executed by lowering the primary pulley pressure Ppri.

However, when the primary pulley pressure Ppri is excessively lowered, the belt slip is caused in the primary pulley 21. Accordingly, the lower limit pressure Ppri_lim is set for the primary pulley pressure Ppri such that the belt slip is not caused in the primary pulley 21. Therefore, when the downshift is executed by lowering the primary pulley pressure Ppri, the primary pulley pressure Ppri sometimes becomes the lower limit pressure Ppri_lim.

After the primary pulley pressure Ppri becomes the lower limit pressure Ppri_lim, increasing the secondary pulley pressure Psec executes the downshift.

The second predetermined pressure P2 is the secondary pulley pressure Psec that achieves the target speed ratio It in a state where the primary pulley pressure Ppri is the lower limit pressure Ppri_lim. That is, in the case where the secondary pulley pressure Psec is the second predetermined pressure P2, the speed ratio Ia of the variator 20 can be the target speed ratio It without causing the belt slip even when the primary pulley pressure Ppri becomes the lower limit pressure Ppri_lim.

Figure 4:
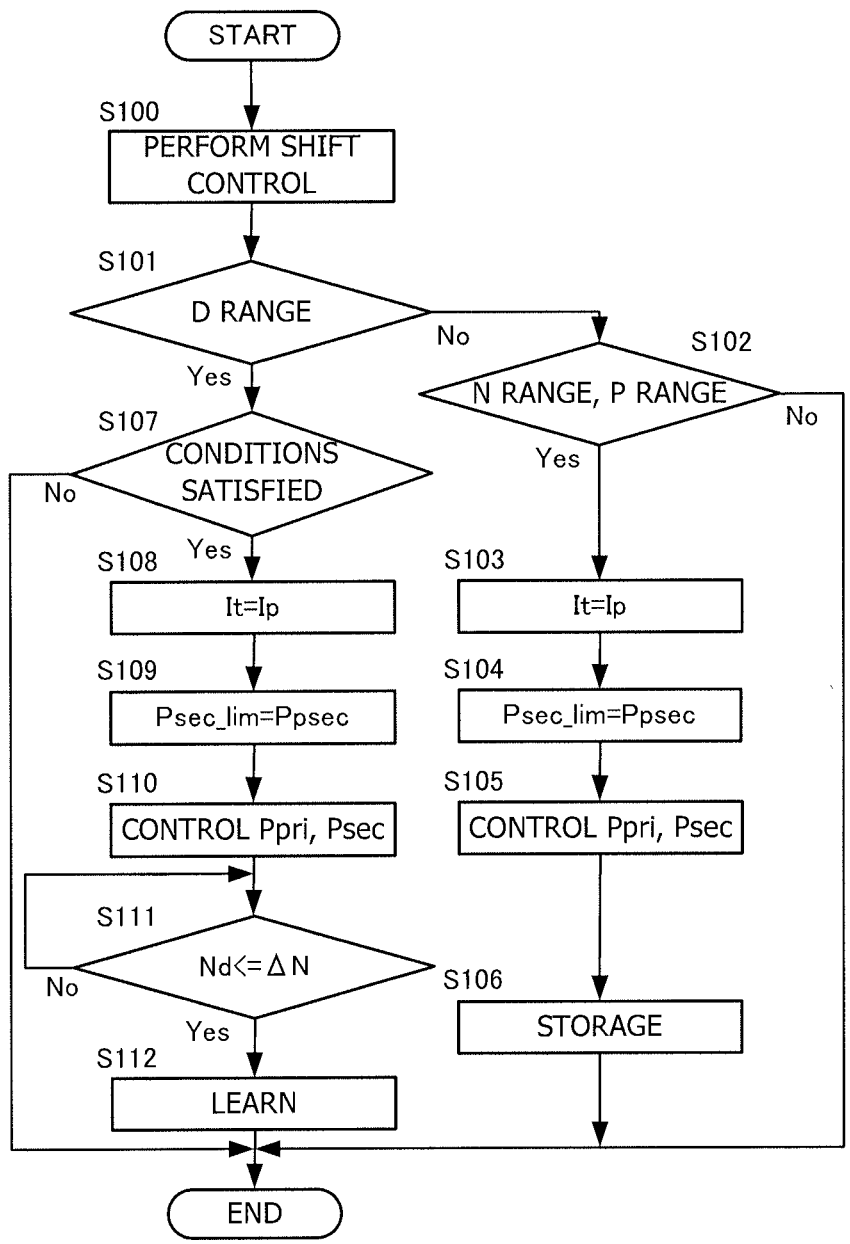
FIG. 4 is a flowchart illustrating a content of a learning control according to ditto embodiment.

Referring again to the description of FIG. 4, at Step S105, the controller 12 controls the primary pulley pressure Ppri and the secondary pulley pressure Psec on the basis of the target speed ratio It. Here, at Step S103, the target speed ratio It is set to the predetermined speed ratio Ip, and the primary pulley pressure Ppri and the secondary pulley pressure Psec are controlled such that the speed ratio Ia of the variator 20 becomes the predetermined speed ratio Ip. It should be noted that since the lower limit pressure Psec_lim of the secondary pulley pressure Psec is set to the predetermined lower limit pressure Ppsec, when the secondary pulley pressure Psec is lower than the predetermined lower limit pressure Ppsec, the secondary pulley pressure Psec is controlled to be the predetermined lower limit pressure Ppsec or more.

This ensures generating the differential pressure that achieves the downshift based on the target speed ratio It only by lowering the primary pulley pressure Ppri without increasing the secondary pulley pressure Psec even when the downshift is performed. Even in the case where the primary pulley pressure Ppri lowers to be the lower limit pressure Ppri_lim, the differential pressure that can achieve the downshift based on the target speed ratio It can be obtained since the secondary pulley pressure Psec is increased corresponding to a selection (P1 or P2) of the predetermined lower limit pressure Ppsec. Therefore, only lowering the primary pulley pressure Ppri ensures controlling the speed ratio Ia of the variator 20 to be the target speed ratio It (the predetermined speed ratio Ip).

At Step S106, the controller 12 calculates the rotational speed difference Nd between the engine rotational speed Ne and the turbine rotational speed Nt and stores the calculated rotational speed difference Nd as the deviation ΔN1. It should be noted that after the predetermined time Tp at which the rotational speed difference Nd between the engine rotational speed Ne and the turbine rotational speed Nt stabilizes is elapsed, the process may be proceeded to Step S106.

At Step S107, the controller 12 determines whether an execution condition of the N idle control is satisfied. The execution condition is satisfied, for example, when the vehicle speed VSP is equal to or less than the predetermined vehicle speed V1 and the brake pedal 52 is pressed. Here, the predetermined vehicle speed V1 is set to, for example, 2 km/h as a value with which the vehicle stop can be determined. When the execution condition is satisfied, the N idle control is executed and the process proceeds to Step S108. When the execution condition is not satisfied, the current process is terminated. The execution of the N idle control lowers the hydraulic pressure of the Low brake 32.

At Step S108, the controller 12 sets the target speed ratio It of the variator 20 to the predetermined speed ratio Ip on the High side with respect to the mechanical largest speed ratio. The predetermined speed ratio Ip is a speed ratio having a value identical to the predetermined speed ratio Ip set at Step S103.

At Step S109, the controller 12 sets the lower limit pressure Psc_lim of the secondary pulley pressure Psec to the predetermined lower limit pressure Ppsec. The predetermined lower limit pressure Ppsec is a pressure having a magnitude identical to the predetermined lower limit pressure Ppsec set at Step S104.

At Step S110, the controller 12 controls the primary pulley pressure Ppri and the secondary pulley pressure Psec on the basis of the target speed ratio It.

Thus, before the learning is performed, in other words, from the execution condition of the N idle control is satisfied and the hydraulic pressure of the Low brake 32 starts to lower to the hydraulic pressure (the learned hydraulic pressure) Ple as the learning value is obtained, setting the lower limit pressure Psc_lim of the secondary pulley pressure Psec to be the hydraulic pressure equal to or more than the predetermined lower limit pressure Ppsec ensures generating the differential pressure that achieves the downshift based on the target speed ratio It only by lowering the primary pulley pressure Ppri without increasing the secondary pulley pressure Psec even when the downshift is performed. Even in the case where the primary pulley pressure Ppri becomes the lower limit pressure Ppri_lim, the differential pressure necessary for the downshift is obtained and the speed ratio Ia of the variator 20 becomes the target speed ratio It (the predetermined speed ratio Ip).

At Step S111, the controller 12 determines whether the rotational speed difference Nd between the engine rotational speed Ne and the turbine rotational speed Nt is equal to or less than a deviation ΔN calculated by adding the predetermined rotational speed difference ΔN2 to the deviation ΔN1. When the rotational speed difference Nd is equal to or less than the deviation ΔN, the process proceeds to Step S112. The deviation ΔN1 is a value stored at Step S106.

At Step S112, the controller 12 obtains the learned hydraulic pressure Ple. Thus, the controller 12 lowers the hydraulic pressure of the Low brake 32 by the execution of the N idle control, specifies a hydraulic pressure command value of the Low brake 32 at the time point when the rotational speed difference Nd becomes the deviation ΔN, and stores this as the hydraulic pressure (the learned hydraulic pressure) Ple at which the Low brake 32 starts the torque transmission. Making the contents of the process at Step S103 to Step S105 identical to the contents of the process at Step S108 to Step S110 ensures using the stored deviation ΔN1 at the time of the learning (when the learned hydraulic pressure Ple is obtained).

In this embodiment, when the deviation ΔN1 is calculated and the learned hydraulic pressure Ple is obtained, the target speed ratio It is set to the predetermined speed ratio Ip and furthermore, the lower limit pressure Psec_lim of the secondary pulley pressure Psec is set to the predetermined lower limit pressure Ppsec to reduce the variation of the friction in the variator 20. Then, the deviation ΔN1 is calculated and stored in a state where the variation is reduced with this, and the learning is executed using the stored deviation ΔN1. Regardless of whether the variator 20 downshifts or upshifts, the speed ratio Ia of the variator 20 can be controlled toward the target speed ratio It without changing the secondary pulley pressure Psec. In particular, the deviation ΔN1 is calculated and stored in a state where the variation of the secondary pulley pressure Psec having a large influence on the variation of the friction in the variator 20 and the variation of the deviation ΔN1, and the learning is executed using the stored deviation ΔN1. Therefore, the learning can be stably executed, thereby ensuring improving the learning accuracy of the hydraulic pressure Ple.

Then, in this embodiment, the stored learned hydraulic pressure Ple is used as the initial hydraulic pressure supplied to the Low brake 32 when the Low brake 32 is reengaged thereafter.

The following describes the effects obtained from this embodiment.

In the case where the hydraulic pressure at which the torque transmission is started when the Low brake 32 is engaged from the disengaged state is learned while the Low brake 32 is disengaged, the target speed ratio It is decreased with respect to the mechanical largest speed ratio and set to the speed ratio on the High side. This ensures reducing continuing the lowering command of the primary pulley pressure Ppri or the increasing command of the secondary pulley pressure Psec by the feedback control to cause the speed ratio Ia of the variator 20 to be the target speed ratio It despite the difficulty of achieving the target speed ratio It due to a shortage of a pump discharging amount and the like. Accordingly, the variations of the primary pulley pressure Ppri and the secondary pulley pressure Psec are reduced to ensure reducing the variation of the friction in the variator 20. Therefore, the learning accuracy regarding the hydraulic control of the friction engaging element (here, the Low brake 32) can be improved.

When the thrust ratio of the primary pulley 21 to the secondary pulley 22 is the thrust ratio to achieve the mechanical largest speed ratio, the target speed ratio It is set to a minimum value that the actual speed ratio Ia of the variator 20 can take, in other words, the predetermined speed ratio Ip on the Highest side. This causes the variation to be on the Low side with respect to the target speed ratio Ip even though the variation with respect to the target speed ratio It is present in the actual speed ratio Ia after the above-described thrust ratio is achieved; therefore, later shifting to achieve the target speed ratio Ip becomes the upshift. This ensures achieving the target speed ratio Ip by increasing the primary pulley pressure Ppri without varying the secondary pulley pressure Psec; therefore, the variation of the secondary pulley pressure Psec can be reduced. Accordingly, the variation of the friction of the variator 20 is reduced to ensure reducing the variation of the deviation ΔN1, thereby ensuring the improved learning accuracy.

Before the learning and before the calculation of the deviation ΔN, the lower limit pressure Psec_lim of the secondary pulley pressure Psec is caused to be the first predetermined pressure P1 larger than the lower limit value that generates the belt capacity for transmitting the input torque Tin transmitted from the engine 1 without causing the belt slip in the variator 20. This causes the secondary pulley pressure Psec to be in a state higher than the first predetermined pressure P1 at the time of the learning and the calculation of the deviation ΔN, and the secondary pulley pressure Psec increases when the learned hydraulic pressure Ple is actually obtained to ensure avoiding the variation of the friction of the variator 20. Accordingly, the variation of the deviation ΔN1 is reduced with more certainty, thereby ensuring the improved learning accuracy.

The input torque Tin input to the variator 20 is operated on the basis of the turbine torque Tt. For the input torque Tin, for example, the torque signal from the engine 1 can be used. However, since the torque signal from the engine 1 has a large variation width, when the lower limit pressure Psec_lim of the secondary pulley pressure Psec is set on the basis of this torque signal, it is necessary to set the lower limit pressure Psec_lim of the secondary pulley pressure Psec to high in consideration of the variation width of the torque signal so as not to cause the belt slip, thereby causing a disadvantage from the aspect of the fuel consumption quantity and the power consumption quantity. In contrast to this, the turbine torque Tt can be calculated on the basis of the engine rotational speed Ne and the variation width is smaller than that of the torque signal from the engine 1. Accordingly, operating the input torque Tin on the basis of the turbine torque Tt ensures reducing the variation width of the input torque Tin to small, thereby ensuring setting the lower limit pressure Psec_lim of the secondary pulley pressure Psec to low. This ensures the improved fuel consumption quantity and power consumption quantity.

Before the learning and before the calculation of the deviation ΔN, the lower limit pressure Psec_lim of the secondary pulley pressure Psec is caused to be the second predetermined pressure P2 that causes the speed ratio Ia of the variator 20 to be close to the target speed ratio It under the lower limit pressure Ppri_lim of the primary pulley pressure Ppri that does not cause the belt slip in the primary pulley 21. This ensures generating the differential pressure necessary for the downshift only by lowering the primary pulley pressure Ppri when the speed ratio Ia of the variator 20 is changed to the target speed ratio It. Therefore, at the time of the learning and the calculation of the deviation ΔN, without a necessity of increasing the secondary pulley pressure Psec, the variation of the friction of the variator 20 is reduced to ensure reducing the variation of the deviation ΔN1, thereby ensuring the improved learning accuracy.

Here, in the downshift of the variator 20, it is considered that the differential pressure is generated between the primary pulley pressure Ppri and the secondary pulley pressure Psec by lowering the primary pulley pressure Ppri. However, for the primary pulley pressure Ppri, the lower limit pressure Ppri_lim is set in order to reduce the belt slip, thus incapable of decreasing the primary pulley pressure Ppri with respect to the lower limit pressure Ppri_lim. In order to continue the downshift in such a case, it is necessary to increase the secondary pulley pressure Psec.

However, since the secondary pulley pressure Psec has a large influence on the variation of the friction of the variator 20, when the secondary pulley pressure Psec is increased at the time of the learning and the calculation of the deviation ΔN, the friction of the variator 20 and the deviation ΔN vary and the learning cannot be stably executed. In this embodiment, before the learning and before the calculation of the deviation ΔN, the lower limit pressure Psec_lim of the secondary pulley pressure Psec is set to the predetermined lower limit pressure Ppsec to increase the secondary pulley pressure Psec. This ensures generating the differential pressure only by lowering the primary pulley pressure Ppri even when the variator 20 downshifts. Therefore, without the necessity of increasing the secondary pulley pressure Psec having a large influence on the variation of the friction of the variator 20, the variations of the friction and the deviation ΔN1 can be reduced, thereby ensuring the improved learning accuracy.

Setting the higher one out of the first predetermined pressure P1 and the second predetermined pressure P2 to the predetermined lower limit pressure Ppsec reduces the variation of the secondary pulley pressure Psec to ensure reducing the variation of the deviation ΔN1, thereby ensuring the improved learning accuracy.

In this embodiment, while the higher one out of the first predetermined pressure P1 and the second predetermined pressure P2 is set to be the predetermined lower limit pressure Ppsec of the secondary pulley 22, only one of the first predetermined pressure P1 or the second predetermined pressure P2 may be set as the predetermined lower limit pressure Ppsec.

In this embodiment, while the engine 1 is used as the driving source of the vehicle, an electric motor may be used instead of the engine 1 or a combination of the internal combustion engine and the electric motor may be used. The electric motor may be one that only has a function of an engine or may be a motor-generator that doubles functions of an engine and an electric generator.

The learning control described above is also applicable to a control of an automatic transmission including a forward/reverse switching mechanism instead of the sub-transmission mechanism 30.

In the N idle control, the learning may be executed by sequentially storing the hydraulic pressure command values with respect to the engine rotational speed Ne, the turbine rotational speed Nt, and the Low brake 32, calculating the deviation ΔN1 on the basis of the stored engine rotational speed Ne and turbine rotational speed Nt after the disengagement of the Low brake 32 is completed, and calculating the learned hydraulic pressure Ple by using the calculated deviation ΔN1 and predetermined rotational speed difference ΔN2.

While the above description has described the learning regarding the hydraulic control of the Low brake 32 (obtaining and storing the learned hydraulic pressure Ple), the learning target is not limited to this, and may be another friction engaging element, for example, a hydraulic control of the High clutch 33. The hydraulic pressure command value at which the High clutch 33 starts to transmit the torque (in other words, the torque capacity of the High clutch 33 starts to increase from 0) is specified from the deviation between the engine rotational speed Ne and the turbine rotational speed Nt when the High clutch 33 is disengaged during the vehicle stop, and this is stored as the learned hydraulic pressure. Then, the stored learned hydraulic pressure is supplied to the High clutch 33 as the initial hydraulic pressure when the High clutch 33 is reengaged thereafter.

Furthermore, in the shift control at S100 illustrated in FIG. 4, when the speed ratio of the variator 20 is not the Lowest speed ratio when the vehicle is stopped, the target speed ratio is set to the mechanical largest speed ratio in order to cause the speed ratio of the variator 20 to be close to the Lowest speed ratio. However, when the learning control of a zero point of the forward clutch is executed during the vehicle stop or during the vehicle stop state, the target speed ratio is decreased with respect to the mechanical largest speed ratio and set to the High side. Then, even when the speed ratio of the variator 20 is not the Lowest speed ratio at the time of the vehicle stop, when the learning control of the zero point of the forward clutch is not executed or is not necessary to execute, the target speed ratio is not set to the High side but set to the mechanical largest speed ratio to control the actual speed ratio. Here, "when the learning control of the zero point of the forward clutch is not executed at the time of the vehicle stop" is, for example, when it is possible to deteriorate the learning accuracy due to a viscosity of the hydraulic oil is high and the responsivity of the hydraulic pressure is low, such as when the machine is cold, and "when the learning control of the zero point of the forward clutch is not necessary to execute" is, for example, when the learning of the zero point of the forward clutch is already fully done and it is not necessary to execute.

The embodiments of the present invention described above are merely illustration of some application examples of the present invention and not of the nature to limit the technical scope of the present invention to the specific constructions of the above embodiments.

The present application claims a priority based on JP2015-178441 filed before the Japanese Patent Office on Sep. 10, 2015, the entire contents of which is incorporated herein by reference.

The invention claimed is:

1. A control device that controls an automatic transmission including:
   a variator disposed in a power transmission path between a driving source and a driving wheel of a vehicle; and
   a friction engaging element disposed between the variator and the driving wheel, capable of transmitting a power in a connectable/disconnectable manner via the power transmission path, wherein
   the control device is configured to:
     increase a speed ratio of the variator toward a predetermined target speed ratio with disengaging the friction engaging element during a vehicle stop of the vehicle;
     execute learning regarding a hydraulic control of the friction engaging element when the friction engaging element is disengaged during the vehicle stop; and
     decrease the target speed ratio at a time of learning when the learning is executed during the vehicle stop, as compared to a time of vehicle stop other than the time of learning.

2. The control device according to claim 1, wherein the learning is executed on the basis of a rotational speed of the variator.

3. The control device according to claim 1, wherein
a target speed ratio at the time of vehicle stop other than the time of learning is the largest speed ratio that is mechanically settable for the variator.

4. The control device according to claim 3, wherein
the target speed ratio at the time of learning is a speed ratio preliminarily determined as a minimum value that an actual speed ratio possibly takes under a condition that a thrust ratio between a primary pulley and a secondary pulley of the variator is a thrust ratio to achieve the largest speed ratio.

5. The control device according to claim 1, wherein
a hydraulic pressure learned through the learning is a hydraulic pressure at which the friction engaging element starts to transmit a torque at a time of engagement from a disengaged state.

6. The control device according to claim 5, wherein
the learned hydraulic pressure is set to an initial hydraulic pressure supplied to the friction engaging element at a time of reengagement after the disengaged state.

7. The control device according to claim 1, wherein
before the learning, a lower limit pressure of a secondary pulley of the variator is caused to be a first predetermined pressure, the first predetermined pressure being equal to or more than a lower limit value that generates a belt capacity for transmitting a torque transmitted from the driving source without causing a belt slip by the variator.

8. The control device according to claim 7, the vehicle including an internal combustion engine as the driving source, and a torque converter disposed in a power transmission path between the driving source and the variator, wherein
the control device is configured to operate a torque transmitted from the driving source on the basis of a turbine torque of the torque converter.

9. The control device according claim 1, wherein
before the learning, a lower limit pressure of a secondary pulley of the variator is caused to be a second predetermined pressure, the second predetermined pressure causing the transmission ratio of the variator to approach the target speed ratio under a lower limit pressure of the primary pulley that does not cause a belt slip in the primary pulley of the variator.

10. The control device according to claim 9, wherein
a lower limit pressure of a secondary pulley of the variator is caused to be the higher pressure of a first predetermined pressure and the second predetermined pressure, the first predetermined pressure being equal to or more than a lower limit value that generates a belt capacity for transmitting a torque transmitted from the driving source without causing the belt slip.

11. A control method of controlling an automatic transmission with:
a variator disposed in a power transmission path between a driving source and a driving wheel of a vehicle; and
a friction engaging element disposed between the variator and the driving wheel, capable of transmitting a power in a connectable/disconnectable manner via the power transmission path, the control method comprising:
increasing a speed ratio of the variator toward a predetermined target speed ratio with disengaging the friction engaging element during a vehicle stop of the vehicle;
executing learning regarding a hydraulic control of the friction engaging element when the friction engaging element is disengaged during the vehicle stop; and
decreasing the target speed ratio at a time of learning when the learning is executed during the vehicle stop, as compared to a time of vehicle stop other than the time of learning.

12. A control device that controls an automatic transmission including:
a variator disposed in a power transmission path between a driving source and a driving wheel of a vehicle; and
a friction engaging element disposed between the variator and the driving wheel, capable of transmitting a power in a connectable/disconnectable manner via the power transmission path, the control device comprising:
means of increasing a speed ratio of the variator toward a predetermined target speed ratio with disengaging the friction engaging element during a vehicle stop of the vehicle;
means of executing learning regarding a hydraulic control of the friction engaging element when the friction engaging element is disengaged during the vehicle stop; and
means of decreasing the target speed ratio at a time of learning when the learning is executed during the vehicle stop, as compared to a time of vehicle stop other than the time of learning.

* * * * *